Dec. 23, 1924.

E. W. PELL

AUTOMOBILE SIGNAL

Filed May 20, 1921

1,520,306

Inventor
EARL W. PELL.

By J. Kaplan.
Attorney

Patented Dec. 23, 1924.

1,520,306

UNITED STATES PATENT OFFICE.

EARL W. PELL, OF CLEVELAND, OHIO.

AUTOMOBILE SIGNAL.

Application filed May 20, 1921. Serial No. 471,212.

*To all whom it may concern:*

Be it known that I, EARL W. PELL, a citizen of the United States, and resident of Cleveland, county of Cuyahoga, and State of Ohio, have invented certain new and useful Improvements in Automobile Signals, of which the following is a specification.

This invention relates to motor vehicle signal devices and more particularly to that class of signals situated at the rear of a vehicle to indicate the changes in the progress thereof such as described in my patent granted January 1, 1918, Serial No. 1,252,163.

The primary object of the invention resides in the provision of a circuit closer for use in a signal apparatus operable by the steering wheel of a motor vehicle to indicate the direction of travel.

One of the objects of the invention further resides in the construction of a circuit closer of the type above set forth wherein electric contact is made and broken when the steering wheel is operated to indicate whether the vehicle is to turn to the left or right.

Another and very important object of the invention is the construction of a novel and improved circuit closer, designed and capable of being installed on practically any type of motor vehicle without rearranging or reorganizing any of the standard parts, and one in which the mechanism is extremely simple, easily assembled and therefore inexpensive to manufacture, highly efficient in operation, practical and otherwise meeting the requirements necessary for long service without particular care or attention.

With these objects in view and others which will be manifest and suggested as the purpose and nature of my invention are revealed in the following specification and drawing wherein I have shown but one embodiment thereof, Fig. 1 is a front view of the circuit closer and mechanism operatively connected to the steering post.

Figure 1:
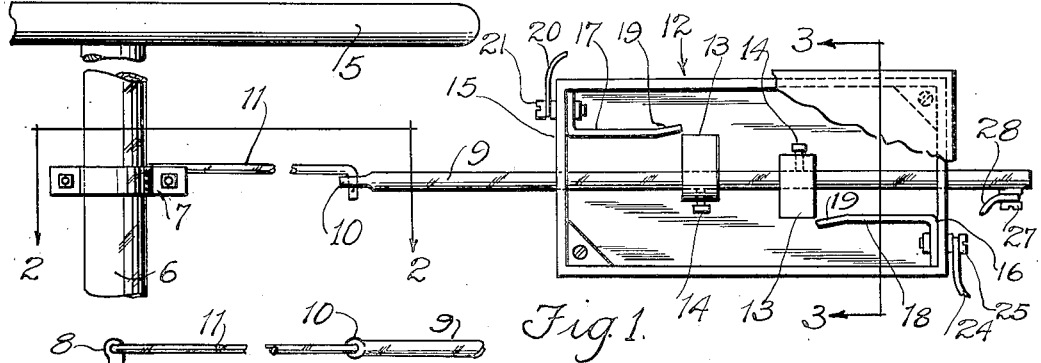
Figure 2:
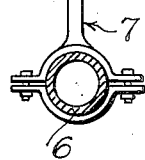
Fig. 2 is a view taken on the line 2—2 of Fig. 1.
Figure 3:
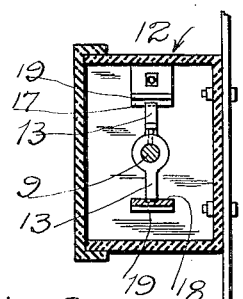
Fig. 3 is a section of the circuit closer taken on the line 3—3 of Fig. 1.

Referring now to the drawings wherein like parts designate corresponding parts throughout the specification, 5 shows a portion of a steering wheel and 6 its steering post to which an insulated clamp 7 is connected in any well known manner as clearly shown by Figs. 1 and 2 of the drawing. The clamp 7 is provided with an eye 8, to which a reciprocating rod 9 having an eye 10 at one end thereof, is loosely connected by a link 11 whereby the rotation of the steering wheel may operate said rod to make electrical contact for a direction signal (not shown) in the manner subsequently to be described.

The reciprocating rod 9 extends through an insulated housing designated in its entirely by numeral 12, said housing or a circuit closer being preferably secured to the vehicle frame in proximity to the steering post. Slidably and adjustably mounted on the rod 9 I have provided a pair of metallic contacts held in reverse position on the rod within the housing by set screws 14. Removably secured to the respective ends 15, 16 of the housing, there are provided spring contacts 17, 18, having their bent ends 19 arranged so as to permit frictional engagement of the adjustable contacts 13 upon reciprocation of the rod 9 upon movement of the steering wheel.

Referring now to Fig. 1, it will be seen that I have provided a conductor 20 having one terminal connected to the binding post of the contact 17 and its opposite terminal to a light signal (not shown). A second conductor 24 has one terminal connected to the binding post 25 of the contact 18 and its opposite terminal to a light a second light signal (not shown). The opposite end of the reciprocating rod is also provided with a binding post 27 for one terminal of a feed conductor 28 connected to a battery not shown.

In the accompanying drawings, I have shown my invention as embodied and illustrated in one way by way of example and which in practice has been found to be highly satisfactory and efficient in obtaining the desired results. It will be understood however, that other embodiments may be resorted to and therefore I do not wish to be limited or restricted to the precise and exact details of construction shown except as specified in the subject matter being claimed.

Having shown and described my invention what I now claim as new and desire to secure by Letters Patent of the United States is:—

A circuit closer of the class described, in combination, an insulating housing having spring-like stationary contact members therein, fastened diagonally opposite each other, said stationary contact members having their free ends bent outwardly and the opposite ends being bent at an angle for the reception of a binding post, a reciprocating rod running thru said insulating housing, an eye formed on one end of the said rod, and a binding post on the opposite end, a link having the ends bent at right angles, a clamp formed in halves and fastened by bolts to the steering post of the vehicle and having an eye, one end of the said link fitting into the eye of the said rod, the other end fitting into the eye of said clamp, adjustable contacts carried by said reciprocating rod in reverse position, adapted to frictionally engage said contact members and set screws to keep said adjustable contacts in the desired position.

In testimony whereof, I affix my signature hereto.

EARL W. PELL.